July 16, 1957            E. J. WARREN            2,799,103
VEHICLE OPENED AUTOMATIC CLOSING GATE
Filed April 15, 1955            3 Sheets-Sheet 1
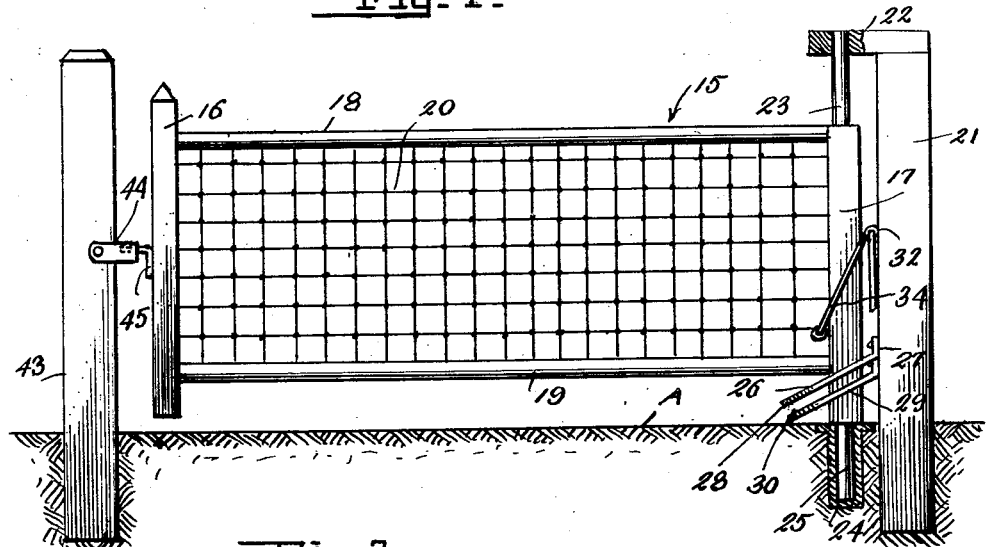
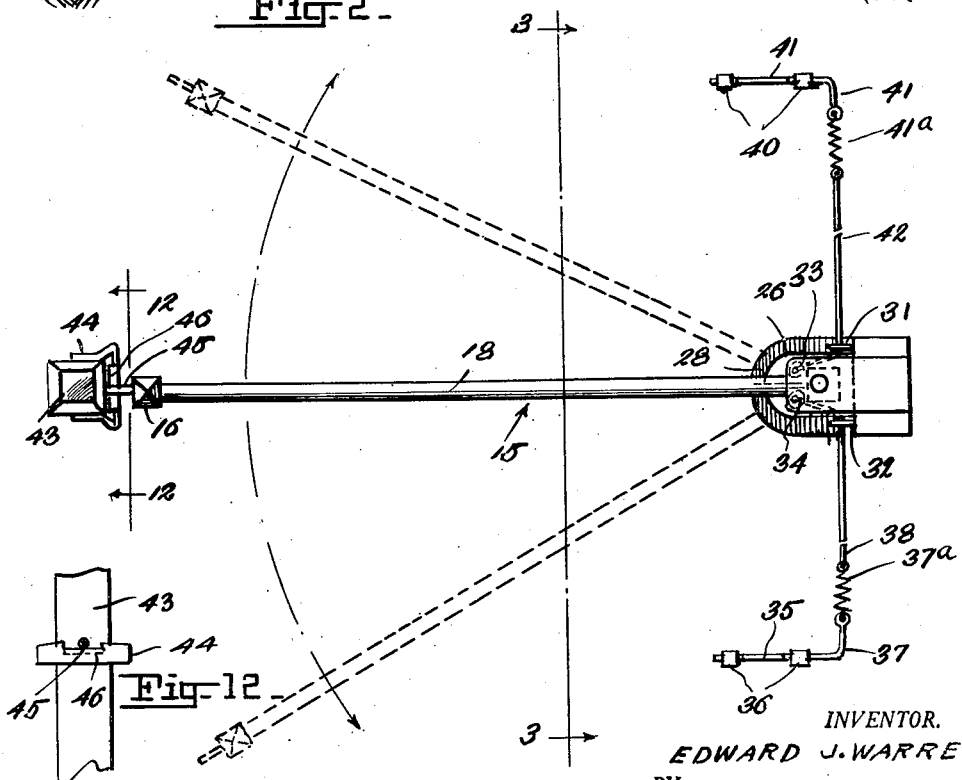
INVENTOR.
EDWARD J. WARREN
BY
Patrick D. Beavers
ATTORNEY July 16, 1957 E. J. WARREN 2,799,103
VEHICLE OPENED AUTOMATIC CLOSING GATE
Filed April 15, 1955 3 Sheets-Sheet 2
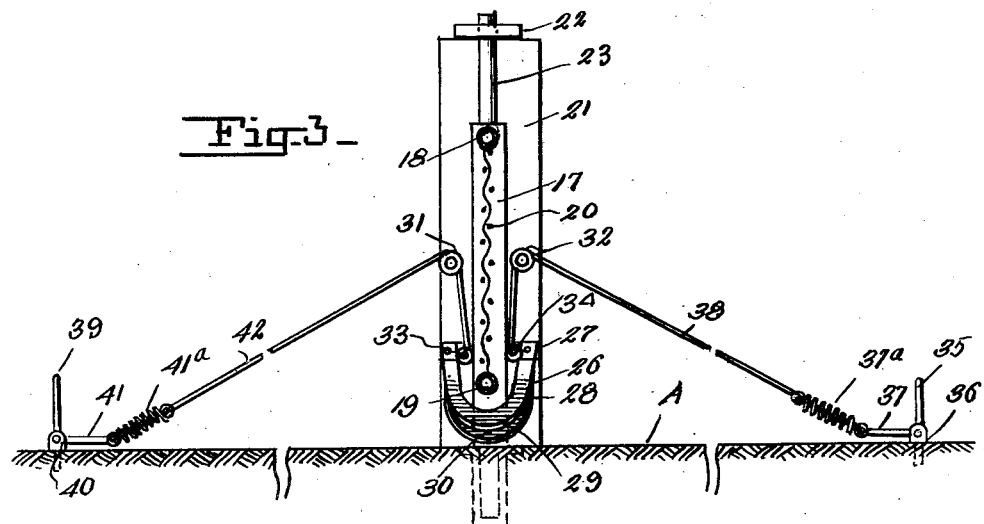
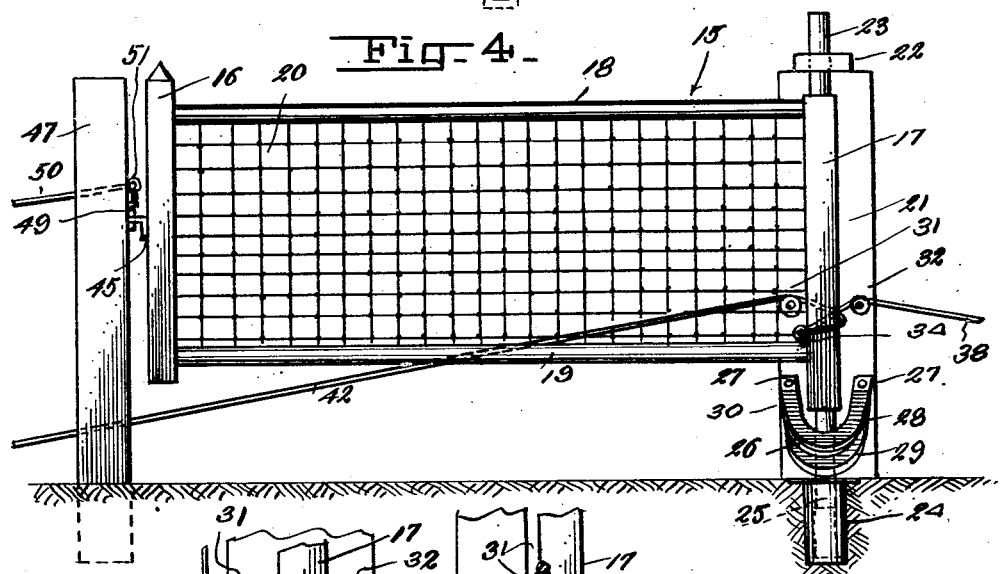
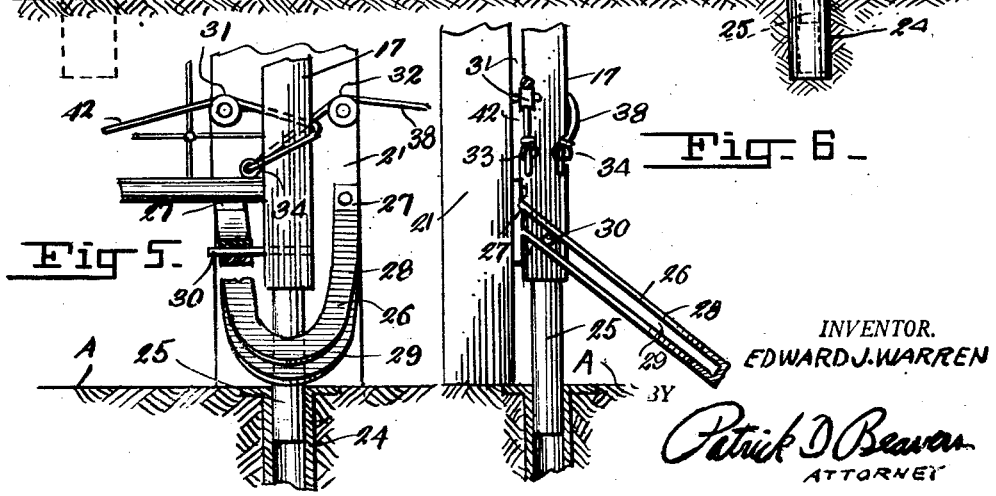
INVENTOR.
EDWARD J. WARREN
BY Patrick D. Beaver
ATTORNEY July 16, 1957   E. J. WARREN   2,799,103
VEHICLE OPENED AUTOMATIC CLOSING GATE
Filed April 15, 1955   3 Sheets-Sheet 3
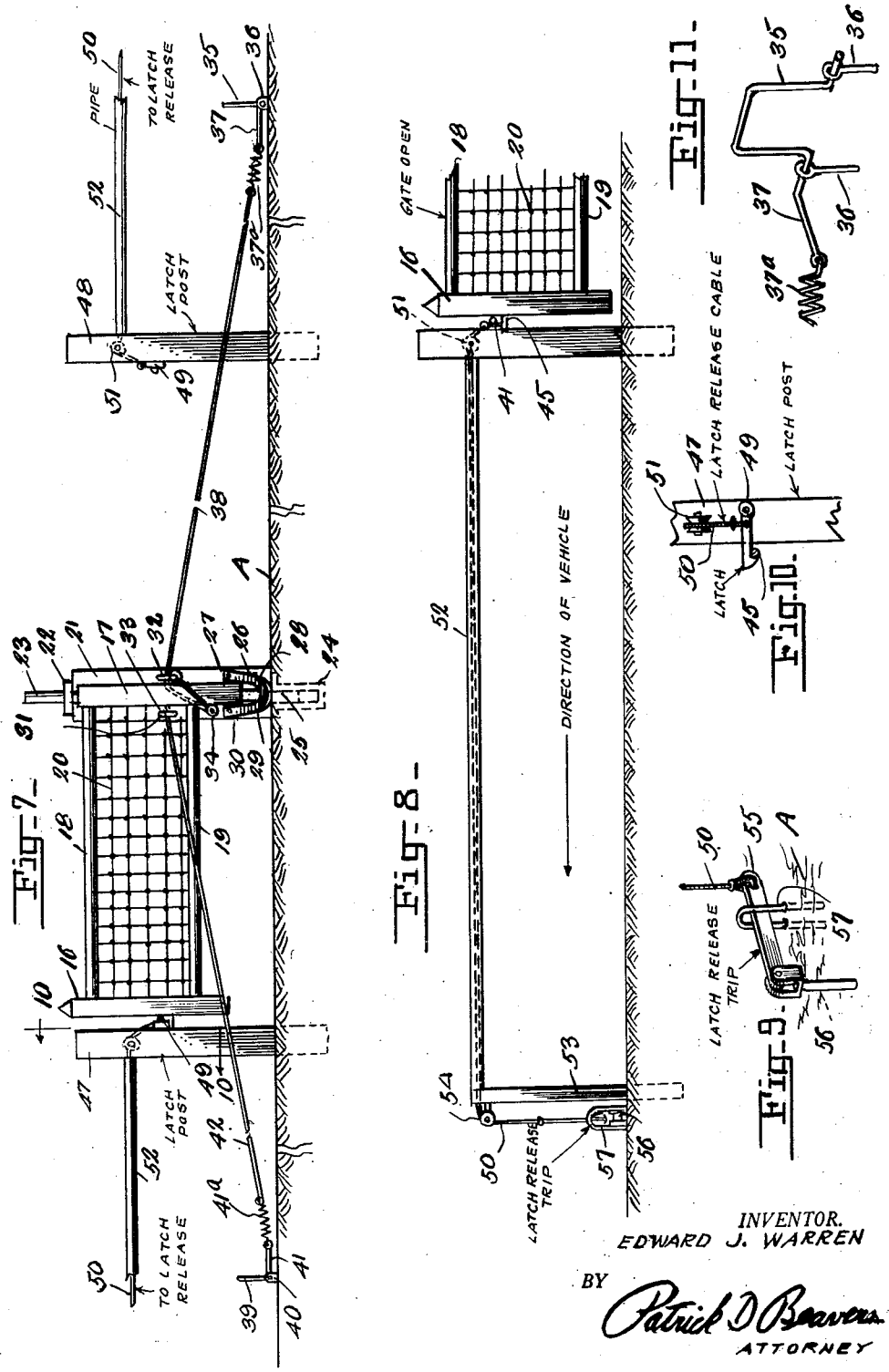
INVENTOR.
EDWARD J. WARREN
BY
Patrick D. Beavers
ATTORNEY

United States Patent Office 2,799,103
Patented July 16, 1957

2,799,103
VEHICLE OPENED AUTOMATIC CLOSING GATE

Edward J. Warren, Austin, Tex., assignor of one-half to O. P. Schoolfield, Austin, Tex.

Application April 15, 1955, Serial No. 501,513

1 Claim. (Cl. 39—18)

This invention relates to improvements in gates and more particularly to a self-opening and closing gate.

It is extremely disagreeable to have to leave an automobile to open a gate, especially in inclement weather. Even in good weather the trouble caused by opening a gate, passing through it and then reclosing it consumes time and gasoline.

An object of the invention, therefore is to provide a self-opening and closing gate which will be opened by an automobile and after the passage of the automobile through the gate will be closed by the automobile.

Another object of the invention is to provide a self-opening and closing gate that will eliminate the necessity of having to alight from an automobile to open and close the gate, thus saving time and gasoline.

With the above and other objects and advantages in view the invention consists of the novel details of construction, arrangement and combination of parts more fully hereinafter described, claimed and illustrated in the accompanying drawings in which:

Fig. 1 is an elevational view of a self-opening and closing gate embodying the invention;

Fig. 2 is a top plan view of Fig. 1 showing the swinging of the gate in either direction with relation to the closed position;

Fig. 3 is a vertical sectional view on the line 3—3 of Fig. 2;

Fig. 4 is an elevational view of the gate in open position;

Fig. 5 is an enlarged detailed fragmentary view, partly in section, of the gate operating device;

Fig. 6 is a side view of Fig. 5;

Fig. 7 is an elevational view showing the gate assembly and two latch posts drawn to a reduced scale;

Fig. 8 is an elevational view, partly broken away, of the latch releasing mechanism;

Fig. 9 is an enlarged perspective view of the latch;

Fig. 10 is an enlarged vertical sectional view on the line 10—10 of Fig. 7;

Fig. 11 is a perspective view of the right hand bell crank as seen in Fig. 7 for opening or closing the gate; and Fig. 12 is an enlarged sectional view on the line 12—12 of Fig. 2.

Referring more in detail to the drawings wherein like parts are designated by like reference numerals, a gate embodying the invention is generally designated by the reference numeral 15.

The gate 15 comprises an end post 16 and a pivot post 17 which are joined in spaced relation to each other by a top rail 18 and a bottom rail 19. The space between the posts 16 and 17 and rails 18 and 19 being closed by a wire mesh 20.

The gate 15 is used in conjunction with a support or post 21. On top of the post 21 is a bushing 22 to receive the pivot rod 23 that is positioned in the upper end of the pivot post 17.

A tubular pivot receiving member 24 is embedded in the ground A adjacent the lower end of the post 21 which is also embedded in the ground as in Fig. 1. The member 24 receives the pivot rod 25 that is positioned in the lower end of the post 17.

Secured to the lower end of the post 21 in inclined relation thereto, is a semi-elliptical shaped trackway 26. The upper ends of the trackway are provided with mounting flanges 27 whereby the upper ends are secured to the post while the curve of the trackway will rest on the ground A, as shown in Figs. 5 and 6. The trackway 26 comprises upper and lower rails 28 and 29, respectively. A pin or rod 30 extends outwardly of the post 17 into the trackway 26 intermediate of the rails 28 and 29 for a purpose to be later described.

A pair of guide pulleys 31 and 32, respectively, are mounted in the post 21 on opposite sides of the post 17. A pair of eyes 33 and 34 are mounted on the post 17 below the horizontal plane of the pulleys 31 and 32.

Mounted at some distance from one side of the gate 15 is a bell crank lever 35, pivot eyes 36 being embedded in the ground for this purpose. This lever has an arm 37 which extends outwardly thereof and a spring 37a is connected at one end to the outer end of the arm 37. A cable 38 is connected to the opposite end of the spring 37a which is connected to the arm 37 and the cable 38 passes through the pulley 32 on the post 21 to be connected to the eye 34 on the post 17.

Mounted at an equal distance on the opposite side of the gate 15 is a second bell crank lever 39, pivot eyes 40 mounting this lever in similar manner to the lever 35. An arm 41 extends from the lever 39 and a spring 41a is connected at one end to the outer end of the arm 41. A cable 42 is connected to the opposite end of the spring 41a which is connected to the arm 41 and the cable 42 passes through the pulley 31 on the post 21 to be connected to the eye 33 on the post 17.

The springs 37a and 41a eliminate the jerk that is caused on the cables as the wheel of the vehicle engage the bell crank levers 35 or 39 as will be later described. The springs 37a and 41a also reduce the speed of the gate in its opening movement to eliminate any shock that will be caused by the gate striking the keeper post 43 as will be later described.

When the gate is in closed position, a keeper post 43 is arranged in opposed relation to the post 21, as shown in Fig. 2. A keeper 44 is secured to the post 43 in line with the latch bolt 45 on the post 16.

Viewing Fig. 12 a recess 46 is shown in the keeper 44, when the gate is in closed position the latch bolt 45 remains in the recess 46, but as the gate is opened and is elevated by the rod 30 riding the inclined trackway 26 the latch bolt 45 moves outwardly of the recess 46 to allow the gate to open.

A first latch post 47 is positioned to one side of the post 21 in alinement therewith and a second latch post 48 is positioned to the opposite side of the post 21 in alinement with the posts 21 and 47.

Viewing Fig. 7, it will be seen that each post 47 and 48 is provided with a pivoted latch 49 that will engage the latch bolt 45 on the post 16, as it is moved to a position adjacent either of the posts 47 and 48.

Each latch 49 has a control cable 50 connected thereto and each cable 50 passes over a pulley 51 mounted on its respective post.

A tubular member or pipe 52 extends from each of the posts 47 and 48 in alinement therewith to a post 53 that is positioned adjacent the bell crank lever 35 and 39.

Each of the posts 53 is provided with a pulley 54 over which the cable 50 will pass to be connected to a latch release trip 55, see Fig. 9. The trip 55 is provided with a yoke 56 which is embedded in the ground A and a staple 57 positioned over the trip 55 is also embedded in the ground A.

When it is desired to open the gate, the automobile will engage the front wheel with either of the bell cranks 35 or 39, as the cranks are pushed downwardly the cables 38 or 42 will open the gate causing the rod 30 to ride upwardly in the trackway 26. The gate will move open until the latch 49 will engage the rod 45 and retain the gate in open position.

When the automobile has passed through the gate the front wheel will engage the trip 55 causing the cable 50 to raise the latch 49 and permit the gate to close by gravity.

The gate can be opened when the automobile is moving in either direction and may also be closed when the automobile is moving in either direction.

The gate opens by the pull on the cables 38 and 42 and closes by gravity when the latch is disengaged from the rod 45.

There has thus been provided a gate that is self-opening and self-closing and it is believed that the construction and operation of the gate will be apparent to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A self-opening and closing gate comprising means for hanging a gate so it will swing in either direction, a bell-crank lever mounted in the ground remotely from said gate at either side thereof, a pair of cables each connected at one of its ends to one side of said gate, a pair of springs each interconnecting the other ends of said cables to one of said bell crank levers, a fixedly mounted downwardly inclined double trackway associated with said gate, and a rod affixed to said gate and extending into said trackway.

References Cited in the file of this patent

UNITED STATES PATENTS

| | | |
|---|---|---|
| 721,600 | Patrick | Feb. 24, 1903 |
| 888,537 | Seiser | May 26, 1908 |
| 1,364,954 | Ruck | Jan. 11, 1921 |
| 1,717,473 | Stewart | June 18, 1929 |
| 1,894,549 | Akers | Jan. 17, 1933 |
| 2,628,441 | Enghauser | Feb. 17, 1953 |